(12) United States Patent
Yang et al.

(10) Patent No.: US 7,801,974 B2
(45) Date of Patent: Sep. 21, 2010

(54) CONFIGURATION AND MANAGEMENT SYSTEM AND IMPLEMENTATION METHOD OF MULTI-PROTOCOL LABEL SWITCHING VPN

(75) Inventors: Qiuyuan Yang, Shenzhen (CN); Yuzhi Ma, Shenzhen (CN); Jie Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2041 days.

(21) Appl. No.: 10/739,986

(22) Filed: Dec. 18, 2003

(65) Prior Publication Data

US 2004/0260707 A1     Dec. 23, 2004

Related U.S. Application Data

(63) Continuation of application No. PCT/CN02/00243, filed on Apr. 8, 2002.

(30) Foreign Application Priority Data

Jun. 21, 2001     (CN) .................. 01 1 20966

(51) Int. Cl.
*G06F 15/177* (2006.01)
(52) U.S. Cl. .................. 709/220; 709/223; 370/398
(58) Field of Classification Search .................. 709/223, 709/230, 220; 307/398
See application file for complete search history.

(56) References Cited

U.S. PATENT DOCUMENTS

| | | | |
|---|---|---|---|
| 5,321,837 A | 6/1994 | Daniel et al. | |
| 6,205,488 B1 * | 3/2001 | Casey et al. | 709/238 |
| 7,028,098 B2 * | 4/2006 | Mate et al. | 709/238 |
| 7,039,687 B1 * | 5/2006 | Jamieson et al. | 709/220 |
| 7,203,762 B2 * | 4/2007 | Yamada et al. | 709/238 |
| 7,437,469 B2 * | 10/2008 | Ellanti et al. | 709/229 |
| 7,467,215 B2 * | 12/2008 | Ould-Brahim | 709/230 |
| 2004/0073890 A1 * | 4/2004 | Johnson et al. | 717/124 |
| 2006/0168279 A1 * | 7/2006 | Lee et al. | 709/230 |
| 2007/0250612 A1 * | 10/2007 | Elias et al. | 709/223 |

FOREIGN PATENT DOCUMENTS

| | | |
|---|---|---|
| EP | 1122914 A2 | 8/2001 |
| JP | 2001007849 A | 1/2001 |

OTHER PUBLICATIONS

International Search Report of PCT/CN02/00243 mailed on Jun. 27, 2002.

* cited by examiner

*Primary Examiner*—Faruk Hamza

(57) ABSTRACT

The invention relates to a configuration and management development system for MPLS VPN in the network management field of a data communication. The development system is a three-dimensional structure, which includes first dimension of view layer, second dimension of management layer and third dimension of TCP/IP layer, and each layer is divided into several sub-layers. MPLS VPN can be implemented in various different ways with the development system; software having better adaptability can be developed. With the development system, configuration and management software for MPLS VPN can be rapidly designed and implemented. The configuration and management software, developed with the development system, has a modularized structure with clear specification and a better expandability.

5 Claims, 3 Drawing Sheets

CONFIGURATION AND MANAGEMENT SYSTEM AND IMPLEMENTATION METHOD OF MULTI-PROTOCOL LABEL SWITCHING VPN

CROSS-REFERENCE TO RELATED APPLICATIONS

This application is a continuation of PCT/CN02/00243 filed on Apr. 8, 2002 which claims the benefit of Chinese Patent Application No. 01120966.6 filed on Jun. 21, 2001. The disclosures of the above applications are incorporated herein by reference.

FIELD OF THE INVENTION

The invention generally relates to the network management field of a data communication, more especially to a development system of configuration and management for Multi-Protocol Label Switching (MPLS) Virtual Private Network (VPN) and implementation method thereof.

BACKGROUND OF THE INVENTION

With growing popularity of MPLS VPN, it is urgently needed to develop configuration and management software for MPLS VPN, which is a core management function for the MPLS VPN technology. MPLS VPN is a highly standardized technology, so it is possible and necessary to create a unique configuration and management development system of MPLS VPN for developing software. At present, there is no such a development system.

At present, the international standard organizations have drafted a relatively unique and complete standard to guide the implementation of MPLS VPN. Accordingly, when configuration and management software of MPLS VPN applies relatively unique mode and method, it is more possible to create a software development system. Secondly, under a unique standard, there are many different implementation ways, so the configuration and management software for MPLS VPN needs a wider adaptability. This means that when MPLS VPN is implemented with different ways, without any update or with less update the configuration and management software for MPLS VPN can satisfy different requires of implementation.

SUMMARY OF THE INVENTION

Purpose of the invention is to create a software development system for configuration and management of MLPS VPN in order that software created with the development system can have better adaptability.

The invention proposes a three-dimensional development system for configuration and management software of MPLS VPN, and an implementation method for the system of MPLS VPN configuration and management.

An implementation method for the system of MPLS VPN configuration and management comprises the following steps:
 a) organizing the system for MPLS VPN configuration and management in three-dimensional structure: first dimension of view layer, second dimension of management layer and third dimension of TCP/IP layer;
 b) dividing said first dimension view layer into three sub-layers: user layer, middle layer and device layer;
 c) dividing said second dimension management layer into three sub-layers: business management layer (BML), network management layer (NML) and network element management layer (EML);
 d) dividing said third dimension TCP/IP layer into two sub-layers: data link layer and IP layer;
 e) defining user view;
 f) defining middle view; and
 g) defining device view.
 Said step of defining device view includes:
 i) defining data link layer configuration: BML configuration of data link layer, NML configuration of data link layer and EML configuration of data link layer; and
 ii) defining IP layer configuration: BML configuration of IP layer, NML configuration of IP layer and EML configuration of IP layer.
 Said step of defining middle view includes:
 i) defining data link layer configuration: BML configuration of data link layer, NML configuration of data link layer and EML configuration of data link layer; and
 ii) defining IP layer configuration: BML configuration of IP layer, NML configuration of IP layer and EML configuration of IP layer.
 Said step of defining user view includes:
 i) defining data link layer configuration: BML configuration of data link layer, NML configuration of data link layer and EML configuration of data link layer; and
 ii) defining IP layer configuration: BML configuration of IP layer, NML configuration of IP layer and EML configuration of IP layer.

A development system for MPLS VPN configuration and management, proposed by the invention, is a three-dimensional structure, which includes first dimension of view layer, second dimension of management layer and third dimension of TCP/IP layer. Each dimension also has several sub-layers.

The first dimension view layer is divided into three sub-layers: user view, middle view and device view. The second dimension of management layer is divided into three sub-layers: BML, NML and EML, from top to down. The third dimension TCP/IP layer is divided into data link layer and IP layer.

When network management software for MPLS VPN configuration and management is developed with the development system of the invention, it takes data element as the kernel data structure, so the network management software will have better expandability. The development system will make the configuration and management software for MPLS VPN easier to design and develop, clear modular structure and better expandability.

Software based on simple network management protocol (SNMP) and software based on TELNET for MPLS VPN configuration and management have been developed with the development system of the invention. Practice shows that the software has advantages: duration for the software development is short, the software structure is highly modularized and the software has better expandability.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
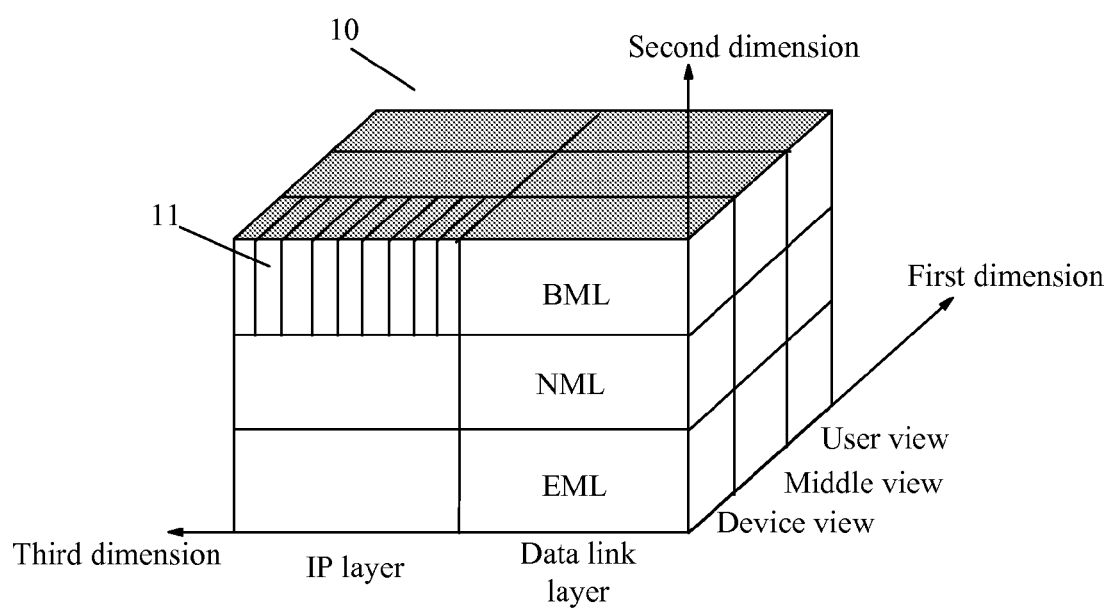
FIG. 1 shows module diagram of the configuration and management development system for MPLS VPN.

The configuration and management development system for MPLS VPN is a modularized element with three dimensions, as shown by 10 in FIG. 1. The three-dimensional coordinate axises of system 10 are mutually perpendicular. Therefore, the stripe part 11 on FIG. 1 represents device view of business management layer of IP. In this way, when the three-dimensional system is broken into modules, each module can be implemented with a group based on its basic elements.

The modules 10 of the element with three dimensions can be further described as follow:

The first dimension is a view layer that includes user view, middle view and device view. They can be expressed as:

One dimension: M=(User View, Middle View, Device View).

The second dimension is a management layer that includes business management layer (BML), network management layer (NML) and network element management layer (EML). Combining the second dimension with the first dimension, two-dimensional relationships are formed:

| Two dimensions: | User View = (U-BML, U-NML, U-EML); |
| --- | --- |
| | Middle View = (M-BML, M-NML, M-EML); |
| | Device View = (D-BML, D-NML, D-EML). |

The third dimension is the network service TCP/IP layer that includes data link layer and IP layer; combining with other two dimensions, a three-dimensional module is formed:

| Three dimensions: | U-BML = (U-BML-IP, U-BML-Data Link); |
| --- | --- |
| | U-NML = (U-NML-IP, U-NML-Data Link); |
| | U-EML = (U-EML-IP, U-EML-Data Link); |
| | M-BML = (M-BML-IP, M-BML-Data Link); |
| | M-NML = (M-NML-IP, M-NML-Data Link); |
| | M-EML = (M-EML-IP, M-EML-Data Link); |
| | D-BML = (D-BML-IP, D-BML-Data Link); |
| | D-NML = (D-NML-IP, D-NML-Data Link); |
| | D-EML = (D-EML-IP, D-EML-Data Link). |

Wherein, in the one-dimensional view layer, the symbol "M=" represents that the one-dimensional view layer of the development system includes a user view, a middle view and a device view.

In the two-dimensional management layer, symbol "U-XXX" represents XXX of a User View, symbol "M-XXX" represents XXX of a Middle View and symbol "D-XXX" represents XXX of a Device View. Specifically speaking, symbol U-BML represents the business management layer of the user view. Symbol U-NML represents the network management layer of the user view. Symbol U-EML represents the network element management layer of the user view. Symbol M-BML represents the business management layer of the middle view. Symbol M-NML represents the network management layer of the middle view. Symbol M-EML represents the network element management layer of the middle view. Symbol D-BML represents the business management layer of the device view. Symbol D-NML represents the network management layer of the device view. Symbol D-EML represents the network element management layer of the device view.

In the three-dimensional network service TCP/IP, symbol "X-BML-XXX" represents XXX of a business management layer of an X view; symbol "X-NML-XXX" represents XXX of a network management layer of an X view; symbol "X-EML-XXX" represents XXX of a network element management layer of an X view. Symbol "X-Y-IP" represents the IP layer of a Y management layer of an X view. Symbol "X-Y-Data Link" represents the data link layer of a Y management layer of an X view. For example, symbol U-BML-IP represents the IP layer of the business management layer of the user view; symbol M-NML-IP represents the IP layer of the network management layer of the middle view; symbol D-EML-Data Link represents the data link layer of the network element management layer of the device view. In FIG. 1, the stripe part 11 is the IP layer of the business management layer of the device view, i.e., D-BML-IP.

Consequently, the development software for configuration and management of MPLS VPN can be divided into modules according to the three-dimensional element of the invention. For example, the element sets for data link layer of the business management layer of the middle view should be designed and implemented as a module. In the following, the three-dimensional layer structure of the system will be described in more detail, i.e., the implementation method of the development system will be described.

In the first dimensional view layer, the configuration and management software for MPLS VPN is divided into three views: the user view, the middle view and the device view. The user view shows elements set of MPLS VPN service that are seen from the user (the network administrator) point of view, and they correspond to the interface modules in software. The middle view shows storage elements set of MPLS VPN service in the network management system, and they correspond to the preprocessing modules for network management software making data configuration in software. The device view shows elements set of MPLS VPN service that can be recognized by routers, and they correspond to the process modules that download configuration data to the devices in software.

The second dimensional is the management layer, on every view layer, the configuration and management software for MPLS VPN is divided into three layers: business management layer, network management layer and network element management layer, according to the management system of telecommunication management network (TMN). The business management layer mainly shows configuration elements set of MPLS VPN service itself, and it mainly corresponds to process module for the VPN routing and forwarding table (VRF). The network management layer mainly shows configuration elements set of network layer, and it corresponds to process module for topology structure and routing protocol. The network element management layer mainly shows the configuration elements set of the individual device and its interface, and it corresponds to process module for the device selection and interface configuration.

The third dimension is the TCP/IP layer. On every management layer, according to TCP/IP protocol, the configuration and management software for MPLS VPN is divided into two layers: IP layer and data link layer. The IP layer corresponds to process module for addressing strategy and IP routing protocol. The data link layer corresponds to process module for two-layer encapsulation of interface.

According to a specific situation, when using the system to develop configuration and management for MPLS VPN, there are two modes. One is the top-down development mode; another is the down-top development mode. Embodiments of the two modes will be described in the following.

The top-down development mode is mainly suitable for synchronized development (developing at the same time) of network management software and device protocol software. In this case, when the device protocol software has not been completed, so the device view is not clear. The development of the network management software is started from the user view, and then gradually mapped to the middle view and device view. The specific implementation flowchart is shown in FIG. 2, wherein a hollow arrow represents mapped relationship, and a solid arrow represents decomposed relationship.

In this embodiment, user views, including the user view of data link layer and the user view of IP layer, are defined first. Defining of each user view is started from the BML, i.e., functions description of the BML, including interface encapsulation configuration, routing protocol configuration. Then, defining of each user view is mapped from BML to NML, and is detailed to different types of interface encapsulation (at data link layer) and configuration function of routing protocol (at IP layer). Finally, defining of each user view is detailed to EML, and is mapped to interface encapsulation of different type devices and IP layer configuration function.

After the user view has been defined, based on it the middle view can be defined. Similarly, it is necessary to define the middle view of data link layer and the middle view of IP layer. Same as starting from the BML, the middle view of BML includes: the interface interactive package and the application logical package of the data link layer, and the interface interactive package and the application logical package of the IP layer. Detailing the BML, then the middle view of NML is obtained, which is mapped to interface interactive group and application logical group of different types of interface encapsulation, and interface interactive group and application group of IP layer different protocols. Finally, detailing the NML, then the middle view of EML is obtained, which is mapped to interface interaction group and application logic group of different type interfaces, and member variable and relational data base table of different routing protocol groups. During the implementation procedure mentioned above, view contents defined by every step are shown in Table 1 to Table 6 below.

Figure 2:
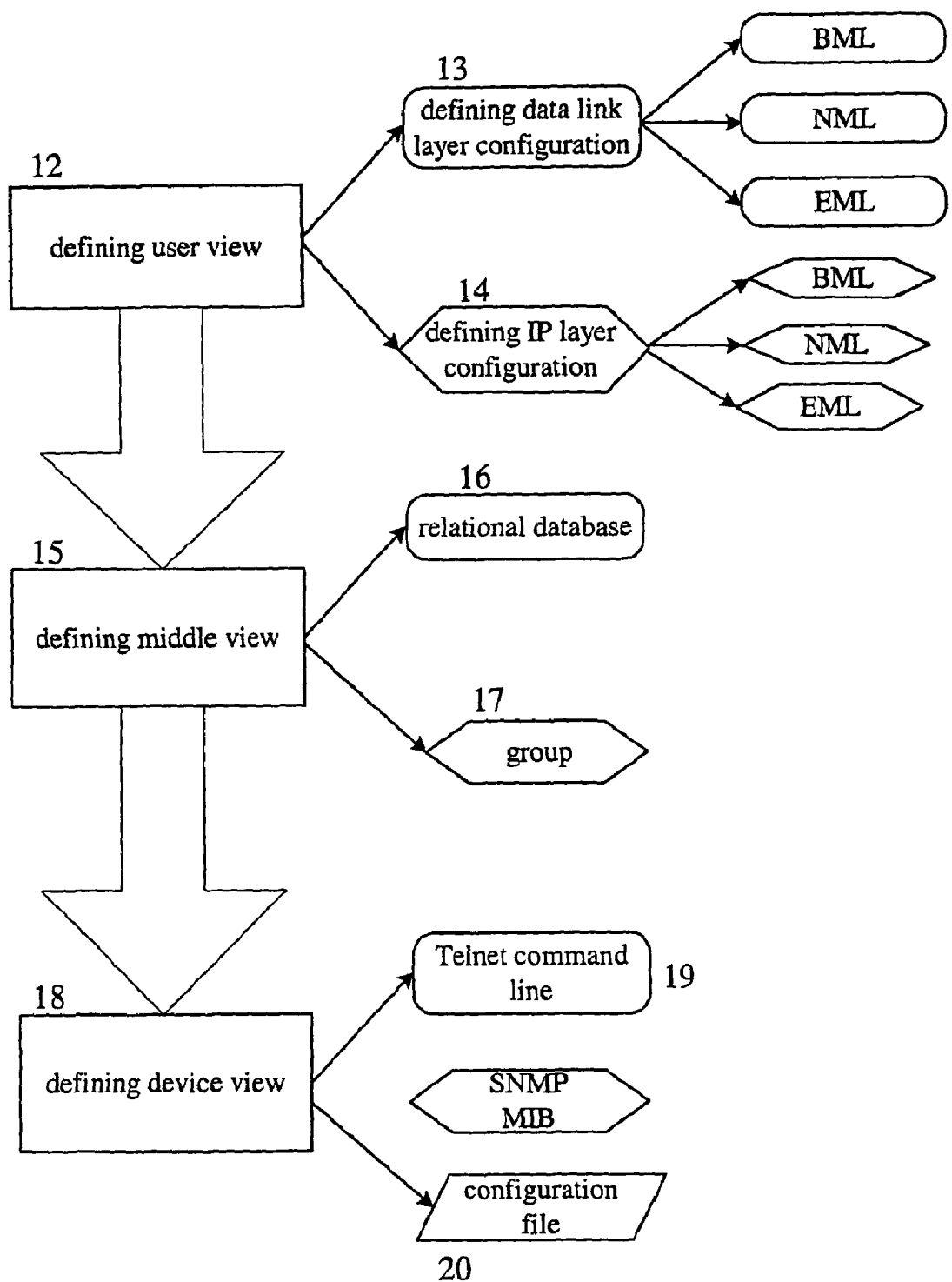
FIG. 2 shows a top-down embodiment of the configuration and management development system for MPLS VPN.

As FIG. 2 shows, the first step 12 of the invention is to define user views, which further includes step 13 for defining data link layer configuration, and step 14 for defining IP layer configuration. The mapping relationships of data link layer of third dimension and other dimensions, i.e., first and second dimensions are shown in Table 1. The mapping relationships of IP layer and other dimensions are shown in Table 2.

The second step 15 of the invention is to define middle views, which further includes step 16 for defining relational database and step 17 for defining groups. Taking design of relational database and object-oriented software as an example, the embodiment of the data link layer is shown in Table 3, and the embodiment of the IP layer is shown in Table 4.

The third step 18 of the invention is to define device views, which further includes TELNET command 19 and configuration file 20. Taking implementation of TELNET command as an example, embodiment of the data link layer is shown in Table 5 and embodiment of the IP layer is shown in Table 6.

According to the method of the invention, parameters of user inputting are transformed from the user view to the middle view then to the device view by the implemented configuration and management of software for MPLS VPN so that a series of TELNET configuration commands is produced, as shown in Table 5 and Table 6; for example, protocol protocol-address atm-vc vcd [broadcast], ip address ip-address ip-mask etc. The configuration commands are sent to devices to perform MPLS VPN configuration.

Figure 3:
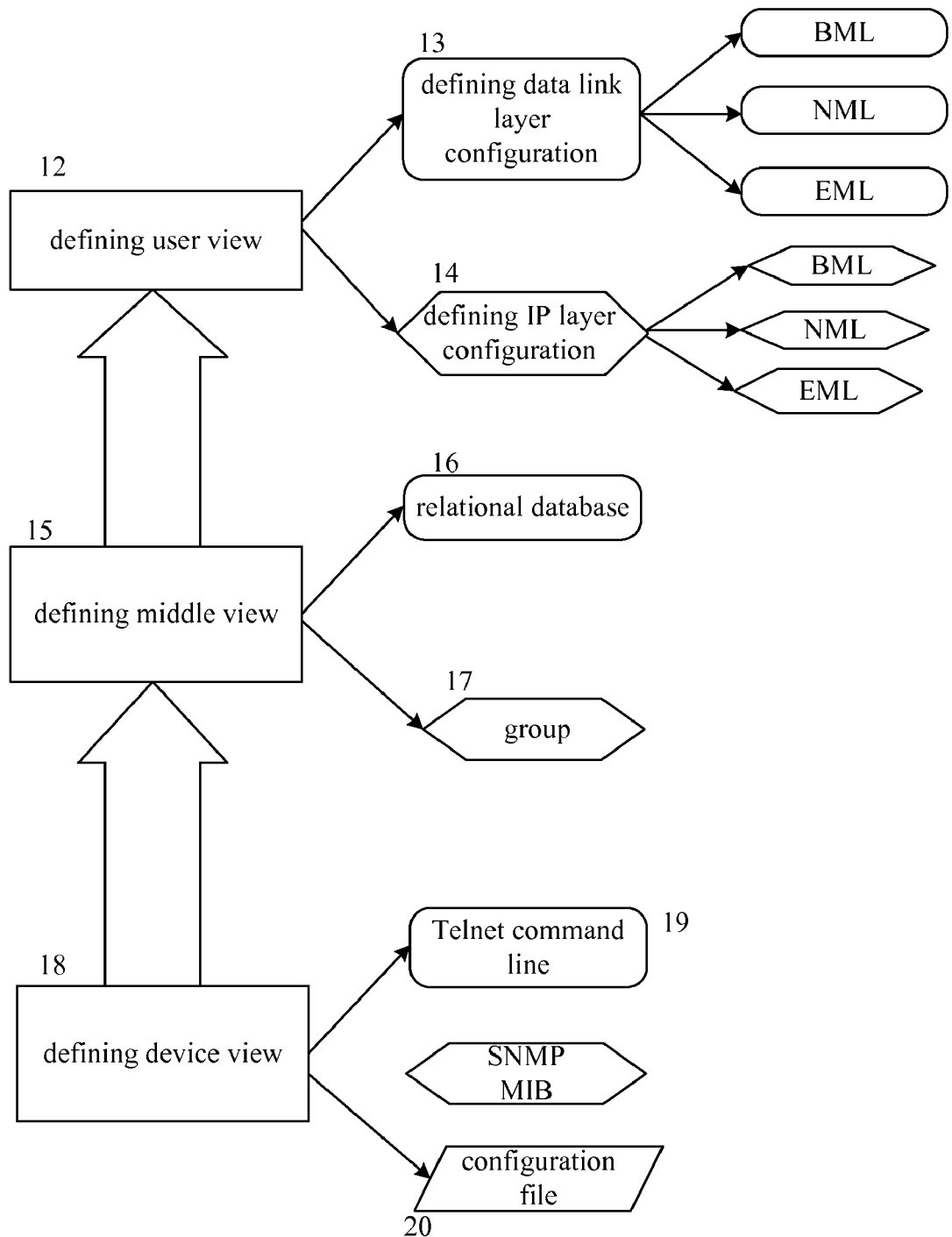
FIG. 3 shows a down-top embodiment of the configuration and management development system for MPLS VPN.

The embodiment of down-top design of the invention is shown on FIG. 3, which is suitable for that the device protocol software has been developed, so the device view is clear. The development is started from the device view and mapped to the middle view and user view gradually. The developing flowchart is shown on FIG. 3, wherein a hollow arrow represents mapped relationship, and a solid arrow represents broken relationship.

Implementation of the down-top design is similar as top-down design on FIG. 2; the only difference is opposite the implementation sequence. A technician in the art can understand the procedure well according to the description of FIG. 2 and Table 1 to Table 6, so it is unnecessary to make a detail description here.

Protection scope of the invention is described in the claims, but any revision that is obviously within purpose of the invention should be included in the scope of the protection.

TABLE 1

Mapping relationship between data link layer and other dimensions from the user view

| | | | | | |
|---|---|---|---|---|---|
| BML configuration of data link layer | Interface encapsulation configuration | | | | |
| NML configuration of data link layer | Encapsulation configuration of ATM interface | | Encapsulation configuration of frame relay interface | | Encapsulation configuration of PPP interface |
| EML configuration of data link layer | Type A device* | Type B device* | Type A device** | Type B device** | Type A device*** | Type B device*** |

*ATM interface encapsulation configurations of type A device and type B device, respectively,
**Frame relay interface encapsulation configurations of type A device and type B device, respectively,
***PPP interface encapsulation configurations of type A device and type B device, respectively.

TABLE 2

Mapping Relationship between IP Layer and Other Dimensions from the User View

| | | | | | | |
|---|---|---|---|---|---|---|
| BML configuration of IP layer | Routing protocol configuration of IP layer | | | | | |
| NML configuration of IP layer | RIP protocol configuration | | BGP protocol configuration | | Static protocol configuration | |
| EML configuration of IP layer | Type A device* | Type B device* | Type A device** | Type B device** | Type A device*** | Type B device*** |

*RIP protocol configurations of type A device and type B device, respectively,
**BGP protocol configuration of type A device and type B device, respectively,
***Static protocol configurations of type A device and type B device, respectively.

TABLE 3

Embodiment of Mapping Relationship between Dimensions for Data Link Layer of the Middle View

| | | | | | | |
|---|---|---|---|---|---|---|
| BML configuration of data link layer | Interface encapsulation configuration: interface interactive package of interface encapsulation and application logical package of interface encapsulation | | | | | |
| NML configuration of data link layer | Encapsulation configuration of ATM interface: interface interactive group of ATM interface encapsulation and application logical group of ATM interface encapsulation | | Encapsulation configuration of frame relay interface: interface interactive group of frame relay interface encapsulation and application logical group of frame relay interface encapsulation | | Encapsulation configuration of PPP interface: interface interactive group of PPP interface encapsulation and application logical group of PPP interface encapsulation | |
| EML configuration of data link layer | Type A device* | Type B device* | Type A device** | Type B device** | Type A device*** | Type B device*** |

*member variables of ATM interface encapsulation configuration and relational database tables of configuration parameters for type A device and type B device, respectively,
**member variables of frame relay interface encapsulation configuration and relational database tables of configuration parameters for type A device and type B device, respectively,
***member variables of PPP interface encapsulation configuration and relational database tables of configuration parameters for type A device and type B device, respectively.

TABLE 4

Embodiment of Mapping Relationship between Dimensions for IP Layer of the Middle View

| | | | | | | |
|---|---|---|---|---|---|---|
| BML configuration of IP layer | Routing protocol configuration: interface interactive package of routing protocol and application logical package of routing protocol | | | | | |
| NML configuration of IP layer | RIP protocol configuration: interface interactive group of RIP protocol and application logical group of RIP protocol | | BGP protocol configuration: interface interactive group of BGP protocol and application logical group of BGP protocol | | Static protocol configuration: interface interactive group of static protocol and application logical group of static protocol | |
| EML configuration of IP layer | Type A device* | Type B device* | Type A device** | Type B device** | Type A device*** | Type B device*** |

*member variables of RIP protocol configuration and relational database tables of configuration parameters for type A device and type B device, respectively,
**member variables of BGP protocol configuration and relational database tables of configuration parameters for type A device and type B device, respectively,
***member variables of static routing configuration and relational database tables of configuration parameters for type A device and type B device, respectively.

TABLE 5

Embodiment of Mapping Relationship between Dimensions for Data Link Layers of the Device View

| | |
|---|---|
| BML configuration of data link layer | Configuration file of interface encapsulation |

TABLE 5-continued

Embodiment of Mapping Relationship between Dimensions for Data Link Layers of the Device View

| NML configuration of data link layer | Configuration file of ATM interface encapsulation | Configuration file of frame relay interface encapsulation | Configuration file of PPP interface encapsulation |
|---|---|---|---|
| EML configuration of data link layer | ATM interface encapsulation configuration of type A device<br>1. map-list name<br>2. protocol protocol-address atm-vc vcd [broadcast]<br>3. interface atm slot/card/port<br>4. ip address ip-address ip-mask<br>5. pvc vcd vpi vci (aal5mux\|aal5snap) protocol {ip\|pppoa virtual-template number\|bridge virtual-ethernet number} td-index index<br>6. map-group name | ATM interface encapsulation configuration of type B device<br>1. map-list name<br>2. protocol protocol-address atm-vc vcd [broadcast]<br>3. interface atm slot/card/port<br>4. interface atm slot/portid<br>5. bind rfm slotid<br>6. ip address ip-address ip-mask<br>7. pvc vce vpi vci {aal5mux\|aal5snap} protocol {ip\|pppoa virtual-template number\|bridge virtual-ethernet number} td-indes index<br>8. map-group name | Omitted    Omitted |

TABLE 6

Embodiment of Mapping Relationship between Dimensions for IP Layers of the Device View

| BML configuration of IP layer | Routing protocol configuration file | | |
|---|---|---|---|
| NML configuration of IP layer | RIP protocol configuration file | BGP protocol configuration file | Static routing configuration file |
| EML configuration of IP layer | RIP protocol configuration file of type A device<br>1. router rip<br>2. peer ip-address<br>3. network { ip-address \| all} | RIP protocol configuration file of type B device<br>1. router rip<br>2. peer ip-address {aal5mux\|aal5snap} protocol {ip\| pppoa virtual-template number\|bridge virtual-ethernet number} td-index index | Omitted    Omitted |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of configuration and management for MPLS VPN, comprising:
   a) managing, by a device for configuration and management system, the MPLS VPN in three-dimensional structure: a first dimension of view layer, a second dimension of management layer and a third dimension of TCP/IP layer;
   dividing, by the device for configuration and management system, said first dimension of view layer into three sub-layers: user view, middle view and device view;
   dividing, by the device for configuration and management system, said second dimension of management layer into three sub-layers: a business management layer (BML), a network management layer (NML) and a network element management layer (EML), wherein the BML includes configuration elements set of MPLS VPN service itself;
   the NML includes configuration elements set of network; and the EML includes configuration elements set of an individual device and its interface;
   dividing, by the device for configuration and management system, said third dimension of TCP/IP layer into two sub-layers: a data link layer and an IP layer, wherein the data link layer includes elements set of two-layer encapsulation of interface; and the IP layer includes elements set of addressing strategy and IP routing protocol;
   defining, by the device for configuration and management system, the user view for the MPLS VPN, wherein the user view includes elements set of MPLS VPN service seen from a user point of view and wherein the defining the user view comprises defining data link layer configuration and defining IP layer configuration;
   defining, by the device for configuration and management system, the middle view for the MPLS VPN, wherein the middle view includes storage elements set of MPLS VPN service in a network management system and wherein the defining the middle view comprises defining relational database and defining groups;
   defining, by the device for configuration and management system, the device view for the MPLS VPN, wherein the device view includes elements set of MPLS VPN service that can be recognized by routers and wherein defining the device view comprises defining TELNET command and defining configuration file; and
   wherein the defining data link layer configuration comprises: defining interface encapsulation configuration on BML configuration of data link layer; defining different types of interface encapsulation configuration on NML configuration of data link layer; and
   defining different devices interface encapsulation mapped to different types of interface on EML configuration of data link layer;
   wherein the defining IP layer configuration comprises: defining routing protocol configuration at IP layer on BML configuration of IP layer, defining different types of routing protocol encapsulation and configuration on NML configuration of IP layer, and defining different devices interface encapsulation mapped to different types of interface on EML configuration of IP layer.

2. The method according to claim 1, further comprising:

transforming, by the device for configuration and management system, parameters inputted by the user from the user view to the middle view then to the device view;

producing, by the device for configuration and management system, a series of configuration commands for the MPLS VPN; and sending, by the device for configuration and management system, the configuration commands to devices for performing MPLS VPN configuration and management.

3. The method according to claim 1, wherein the different types of interface comprises ATM interface, frame relay interface and PPP interface; and wherein the different types of routing protocol comprises RIP protocol, BGP protocol and static routing protocol.

4. A device for configuration and management development system for MPLS VPN, comprising: a first dimension of view layer, a second dimension of management layer and a third dimension of TCP/IP layer;

wherein said first dimension of view layer includes: a user view module, a middle view module and a device view module; wherein the user view module is configured to defining the user view for the MPLS VPN, wherein the user view includes elements set of MPLS VPN service seen from a user point of view and wherein the defining the user view comprises defining data link layer configuration and defining IP layer configuration;

the middle view module is configured to define the middle view for the MPLS VPN, wherein the middle view includes storage elements set of MPLS VPN service in a network management system and wherein the defining the middle view comprises defining relational database and defining groups; and the device view module is configured to define the device view for the MPLS VPN, wherein the device view includes elements set of MPLS VPN service that can be recognized by routers and wherein defining the device view comprises defining TELNET command and defining configuration file;

wherein the user view module comprises at least one module configured to define interface encapsulation configuration on BML configuration of data link layer; define different types of interface encapsulation configuration on NML configuration of data link layer; define different devices interface encapsulation mapped to different types of interface on EML configuration of data link layer; define routing protocol configuration at IP layer on BML configuration of IP layer, define different types of routing protocol encapsulation and configuration on NML configuration of IP layer, and define different devices interface encapsulation mapped to different types of interface on EML configuration of IP layer;

said second dimension of management layer includes: a business management layer (BML) module, a network management layer (NML) module and a network element management layer (EML) module; wherein the BML module is configured to do VPN routing and forwarding table (VRF) processing, the NML module is configured to process topology structure and routing protocol, and the EML module is configured to perform device selection and interface configuration; and said third dimension of TCP/IP layer includes: a data link layer module and an IP layer module; wherein the data link layer module is configured to process two-layer encapsulation of interface, and the IP layer module is configured to process addressing strategy and IP routing protocol.

5. The method according to claim 4, wherein the different types of interface comprises ATM interface, frame relay interface and PPP interface; and wherein the different types of routing protocol comprises RIP protocol, BGP protocol and static routing protocol.

* * * * *